Nov. 28, 1961   YU-CHI HO ET AL   3,011,110
PHASE OR FREQUENCY MODULATED DIGITAL SERVO SYSTEM
Filed May 27, 1957   3 Sheets-Sheet 1

INVENTORS
YU-CHI HO
BY EWELL CALVIN JOHNSON
ATTORNEY

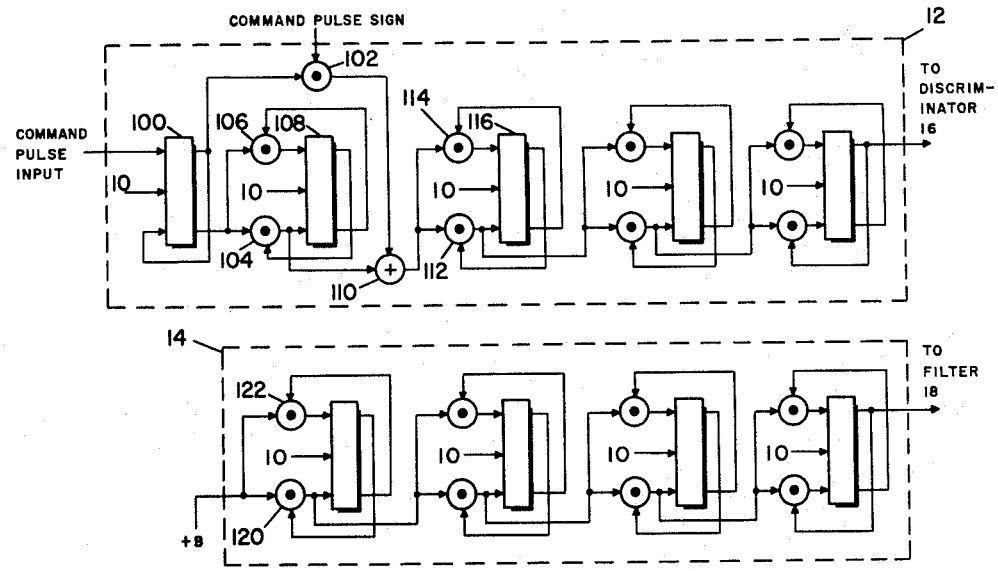
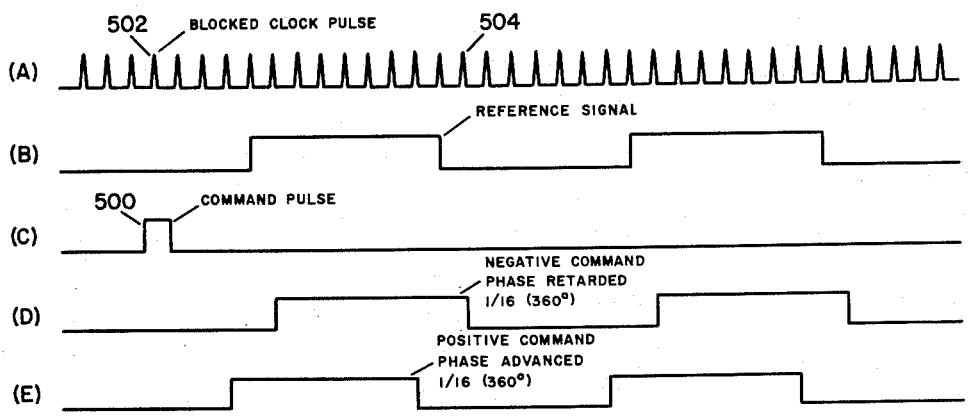
FIG-6

United States Patent Office 3,011,110
Patented Nov. 28, 1961

3,011,110
PHASE OR FREQUENCY MODULATED
DIGITAL SERVO SYSTEM
Yu-chi Ho and Ewell Calvin Johnson, Royal Oak, Mich.,
assignors to The Bendix Corporation, a corporation of
Delaware
Filed May 27, 1957, Ser. No. 661,952
10 Claims. (Cl. 318—28)

This invention relates to a phase or frequency modulated servo system in which numerical information is converted into corresponding phase or frequency information for moving an object, such as a machine tool part, a distance proportional to the numerical information.

More particularly, the present invention relates to a system in which numerical information in the form of discrete electrical pulses is converted into a phase or frequency modulated signal which may be fed to any conventional phase or frequency modulated servo system for driving a machine tool part a distance proportional to the number of pulses received.

In one embodiment of the invention, the output of a constant frequency voltage pulse source is fed to a reference counter or frequency divider and to a command counter or frequency divider. The reference counter produces an output or overflow pulse at regular intervals upon each count of a particular number of input pulses. The output pulses of the reference counter serve as the reference or carrier signal which is introduced to a phase or frequency modulated servo system. Normally, the command counter produces output or overflow pulses at the same regular intervals as the reference counter. However, when command pulses are introduced to the command counter, the phase or frequency of its output pulses is changed relative to the reference counter output an amount proportional to the number of command pulses. The command counter output either leads or lags the reference counter output depending upon the polarity of the command pulses. The output pulses of the command counter thus serve as the phase or frequency modulated signal which is introduced to the servo system for driving a machine tool part a distance proportional to the number of command pulses and in a direction dependent upon the polarity of the command pulses.

An object of this invention is to provide a servo system for moving an object, such as a machine tool part, a distance proportional to numerical information fed to the system.

Another object of the invention is to provide such a servo system in which the numerical information is converted to phase or frequency information.

A still further object is to provide such a servo system in which numerical information in the form of electrical pulses is converted into a phase or frequency modulated electrical signal for moving the object a distance proportional to the pulses and in a direction controlled by the polarity of the pulses.

Other objects and advantages will become apparent from the following detailed description and from the appended claims and drawings.

FIGURES 2 and 3 are more detailed circuit diagrams of some of the blocks shown in FIGURE 1.

FIGURE 6 shows the relationship of the voltages at different terminals in FIGURE 1.

To facilitate the understanding of the invention, the following description of its operation will be directed towards the phase modulation aspect of the system rather than its frequency modulation aspect, it being understood that in the system phase and frequency modulation are essentially the same and may be regarded in the same light.

Figure 1:
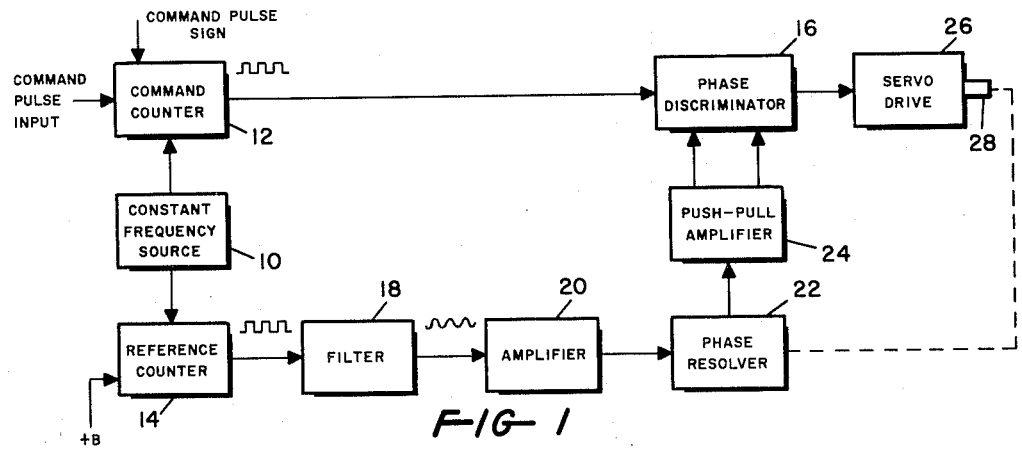
FIGURE 1 is a generalized block diagram of one embodiment of the invention.

Referring to FIGURE 1 a constant frequency, constant amplitude voltage pulse source 10, such as a 100 kilocycle oscillator, introduces input pulses to a command counter 12 and to a reference counter 14. A stream of electrical pulses, hereinafter referred to as command pulses, are introduced to a second input of the command counter 12 and a "high" or "low" input is introduced to a third input of the counter depending upon the polarity of the command pulses. The terms "high" and "low" will be used throughout this description to indicate the voltage level at particular terminals as is common in binary network analysis. For example, "high" may represent +15 volts and "low" may represent 0 volts. In the embodiment to be described, the input will be high for positive command pulses and low for negative command pulses. The output of the command counter 12 is introduced to a phase or frequency discriminator 16.

A high input is introduced to a second input of the reference counter 14 from a power supply. The output of the counter 14 is introduced to a filter 18, such as an R-C filter, for converting square wave pulses to a sinusoidal waveform of the same frequency. The output of the filter 18 is connected to an amplifier 20 which in turn has its output connected to the rotor winding of a phase resolver 22. The voltage output of the phase resolver 22, the phase of which is dependent upon the position of the rotor relative to the stator windings, is introduced to a push-pull amplifier 24. The outputs of the amplifier 24 are introduced to the discriminator 16.

The discriminator 16 produces at its output a D.-C. error voltage having a magnitude dependent upon the difference in phase between the output of the counter 12 and the output of the amplifier 24. The polarity of the error voltage is dependent upon whether the output of the counter 12 leads or lags in phase the output of the amplifier 24. The output of the discriminator 16 is introduced to a servo drive 26.

The drive 26 may include the combination of a torque motor, a servo valve and a hydraulic motor known to persons skilled in the art. The voltage output of the discriminator 16 is introduced to the torque motor to produce a displacement of the motor a distance proportional to the magnitude of the voltage and in a direction determined by the polarity of the voltage. This controls the opening of the servo valve for introducing fluid under pressure to the hydraulic motor for driving the motor at a speed and in a direction dependent upon the magnitude and polarity of the D.-C. error voltage. A machine tool part, such as a shaft 28, is adapted to be driven by the hydraulic motor. The shaft 28 is suitably coupled to the rotor of the resolver 22 for rotating the rotor a corresponding angular distance.

Referring now to FIGURE 2, there is shown in more detail the circuitry included in the counters 12 and 14, which are binary in type. Command pulses are introduced to the left input of a bistable multivibrator 100. Each multivibrator referred to in the following description will be a bistable multivibrator, the detailed circuitry and operation of which will be hereinafter described in connection with FIGURES 4 and 5. The left output of the multivibrator 100 is introduced to its right input and to an "and" gate 102. An "and" gate in computer terminology is a gate which has a high output only when all of its inputs are high. If any of the inputs are low, the output of the gate remains low. Each gate hereinafter described will be a diode "and" gate if it is shown in the drawing as a circle having a dot in the center.

The right output of the multivibrator 100 is introduced to gates 104 and 106 in the first stage of the counter 12. The outputs of the gates 104 and 106 are connected respectively to the left and right inputs of a multivibrator 108. The left and right outputs of the multivibrator 108 are connected, respectively, to inputs of the gates 104 and 106. Introduced to an input of the multivibrator 108 is the output from the constant frequency source 10, which output is also introduced to each multivibrator included in the counters 12 and 14. The outputs of the gate 102 and the gate 104 are introduced to an "or" gate 110. An "or" gate in computer terminology is a gate having a high output whenever any one or more of its inputs are high. Each gate hereinafter described will be a diode "or" gate if it is shown in the drawings as a circle with a plus sign in its center.

The output of the gate 110 is introduced to gates 112 and 114 in the second stage of the counter 12. The outputs of the gates 112 and 114 are introduced, respectively, to the left and right inputs of a multivibrator 116. The left and right outputs of the multivibrator 116 are introduced, respectively, to inputs of the gates 112 and 114.

The output of the gate 112 is introduced to a third stage of the counter 12 and the output of the third stage is introduced to a fourth stage, both of which stages are identical to the first and second stages. The reference counter 14 (FIGURE 2) also includes four binary stages which are identical to the four stages in the command counter 12. As shown in FIGURE 2 a high input from a power supply +B is introduced to gates 120 and 122 of the first stage.

To simplify the description of the invention, only four stages have been used in the counters 12 and 14. In an embodiment built and tested nine binary stages were used in the counters. By using a greater number of stages, greater accuracy is achieved in the system. When nine stages are used, an overflow occurs upon each count of 512 pulses and each command pulse will produce a phase shift of 360/512 degrees while in the four stage system shown an overflow will occur upon each count of 16 and each command pulse will produce a 360/16 degrees phase shift as will be hereinafter described.

The output of the counter 12 is introduced to the discriminator 16 and the output of the counter 14 is introduced to the resolver 22 through the filter 18 and the amplifier 20.

Figure 3:
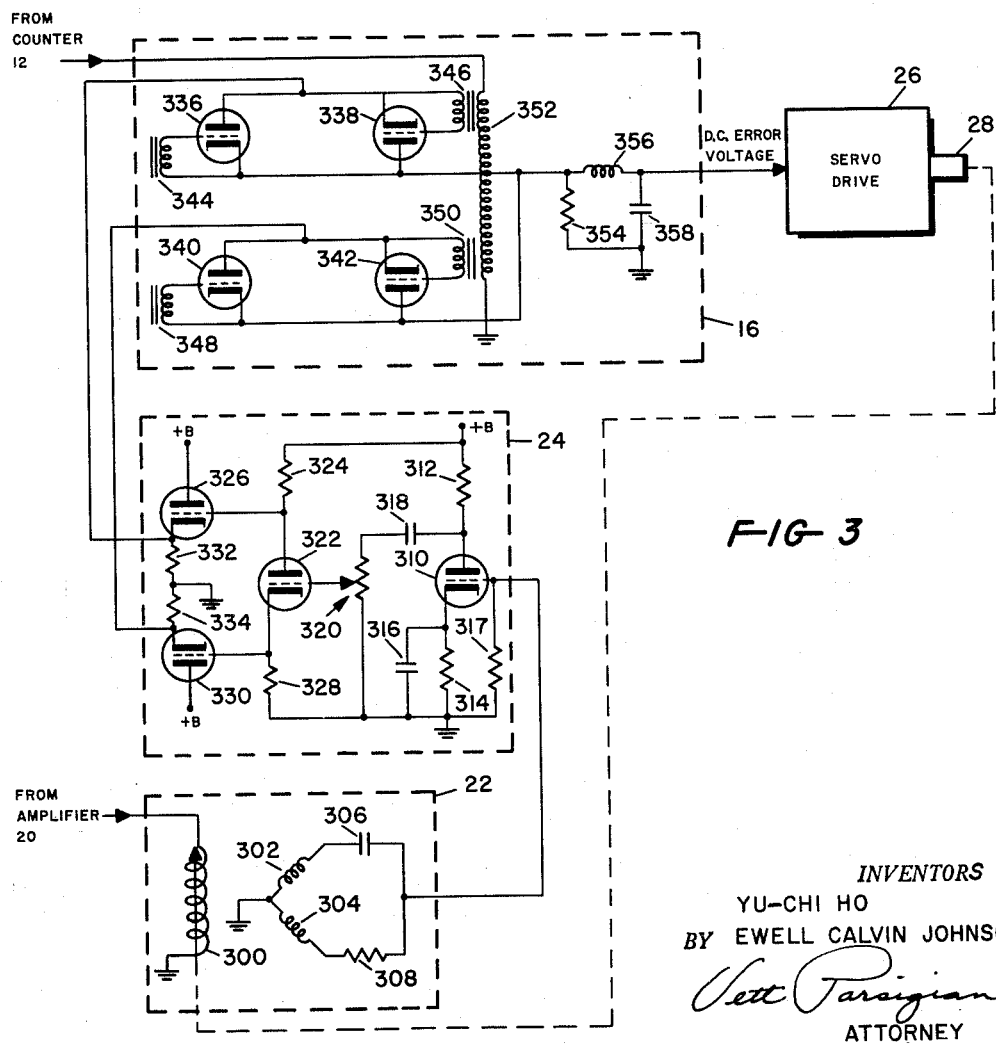

Referring now to FIGURE 3, the output of the amplifier 20 is introduced to one end of the rotor winding 300 of the resolver 22. The other end of the winding 300 is grounded. The two stator windings 302 and 304 of the resolver have a common grounded terminal and the other terminals are connected respectively to a capacitance 306 and a resistance 308. The capacitance 306 and the resistance 308 are connected to the grid of a tube 310 in the push-pull amplifier 24. The plate of the tube 310 is connected to a power supply +B through a resistance 312 and the cathode of the tube is connected to ground through a resistance 314 and a capacitance 316 connected in parallel. The grid of the tube 310 is connected to ground through a resistance 317.

The plate of the tube 310 is also connected to ground through a capacitance 318 and a potentiometer generally indicated at 320 having its movable arm connected to the grid of a tube 322. The plate of the tube 322 is connected to the power supply through a resistance 324 and is also connected to a grid of a tube 326. The cathode of the tube 322 is connected to ground through a resistance 328 and is also connected to the grid of a tube 330. The plates of the tubes 326 and 330 are connected to the power supply and the cathodes are connected to ground through resistances 332 and 334, respectively.

The cathode of the tube 326 is also connected to the plate of a tube 336 and to the cathode of a tube 338 in the discriminator 16. Similarly, the cathode of the tube 330 is connected to the plate and cathode respectively of the tubes 340 and 342. The grids and cathodes of the tubes 336, 338 and 340 and 342 are connected through coils 344, 346, 348 and 350, respectively. All of these coils are inductively coupled to a primary coil 352 having one end grounded and the other end connected to the output of the command counter 12.

The cathodes of the tubes 336 and 340 and the plates of the tubes 338 and 342 are connected to ground through a resistance 354 and also through an inductance 356 and a capacitance 358. The common terminal between the inductance 356 and the capacitance 358 which is the output terminal of the discriminator 16 is connected to the input of the servo drive 26. The shaft 28 connected to the drive 26 is mechanically coupled, such as by gears (not shown) to the rotor coil 300 to produce a corresponding movement of the rotor upon a movement of the shaft.

Figure 4:
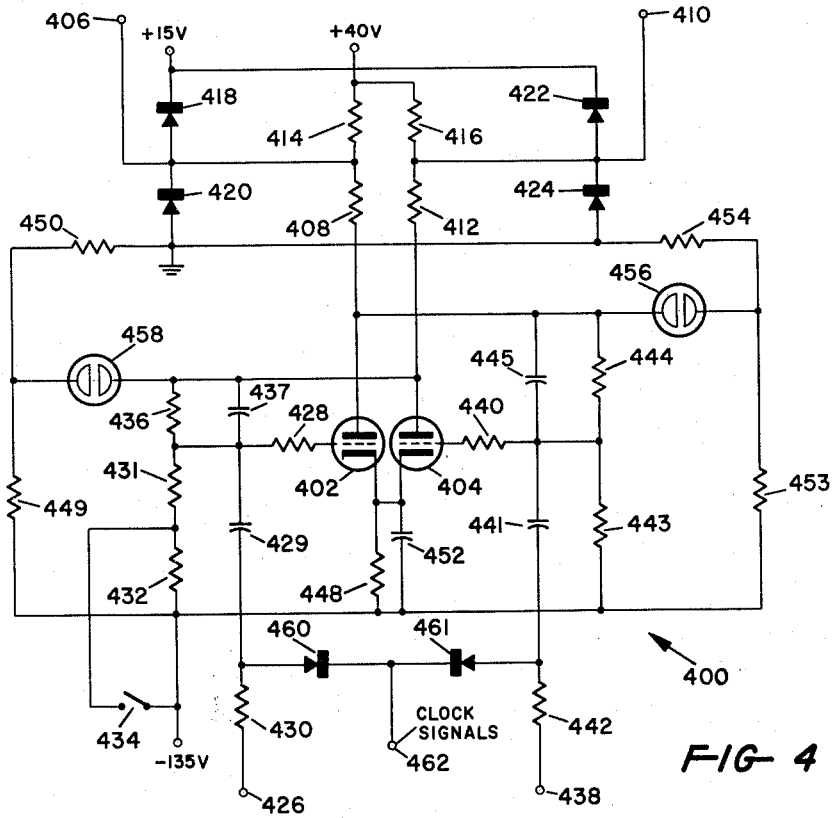
FIGURE 4 is a detailed circuit diagram of the blocks shown in FIGURE 2.

Generally indicated at 400 in FIGURE 4 is a bistable multivibrator, such as may be used in the counters 12 and 14 (FIGURE 2).

The multivibrator 400 includes a left tube 402 and a right tube 404. The plate of the tube 402 is connected to a left output terminal 406 through a resistance 408 and the plate of the tube 404 is connected to the right output terminal 410 through a resistance 412. The resistances 408 and 412 are connected to a suitable source of positive voltage through resistances 414 and 416, respectively.

The output terminal 406 is connected between the resistances 408 and 414 and is also connected between a pair of diodes 418 and 420 which are connected in series between a suitable source of positive voltage and ground. Similarly, the output terminal 410 is connected between the resistances 412 and 416 and between a pair of diodes 422 and 424 which are connected in series between the suitable source of positive voltage and ground.

The grid of the tube 402 is connected to the left input terminal 426 through a resistance 428, a capacitance 429 and a resistance 430. The grid of the tube 402 is also connected to a suitable source of negative voltage through the resistance 428, a resistance 431 and a resistance 432. A circuit including a switch 434 is connected in parallel with the resistance 432. The switch 434 is normally closed to by-pass the resistance 432. The grid of the tube 402 is also connected to the plate of the tube 404 through the resistance 428 and an R-C circuit including a resistance 436 and a capacitance 437.

The grid of the tube 404 is connected to the right input terminal 438 through a resistance 440, a capacitance 441 and a resistance 442. The grid is also connected to the suitable source of negative voltage through the resistance 440 and a resistance 443 and to the plate of the tube 402 through the resistance 440 and an R-C circuit including a resistance 444 and a capacitance 445.

The cathode of the tube 402 is connected to the cathode of the tube 404 and is connected to ground through resistances 448, 449 and 450. The cathode of the tube 404 is connected to ground through a capacitance 452, a resistance 453 and a resistance 454.

A pair of diodes 460 and 461 are connected in series between terminals of the resistances 430 and 442. A terminal 462 is connected to a terminal between the diodes 460 and 461. Voltage pulses from the source 10, which pulses will be hereinafter referred to as clock pulses, are introduced to the terminal 462. The clock pulses are shown in waveform G of FIGURE 5.

Prior to the application of power to the multivibrator 400, the switch 434 is opened so that the resistance 432 is not by-passed. When the power is applied, the left tube 402 becomes conductive and the right tube 404 remains non-conductive. This occurs because the multivibrator 400 actually becomes a monostable multivibrator when the resistance 432 is connected in series with the resistance 431, the stable state providing for a conduction through the left tube 402. Shortly after the application of the power to the multivibrator 400, the switch 434 is closed to by-pass the resistance 432 for balancing the multivibrator circuit so as to make it a bistable multivibrator.

Figure 5:
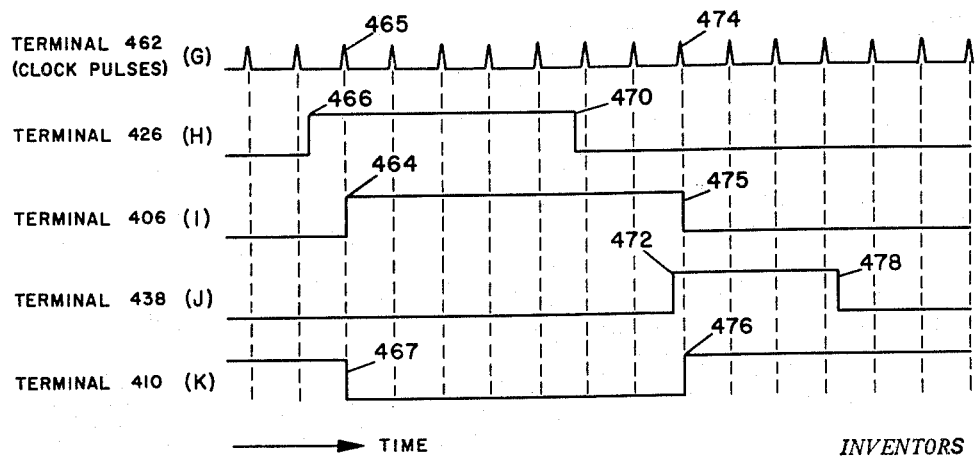
FIGURE 5 shows the relationship of the voltages at different terminals in FIGURE 4.

In this initial state of operation, the right output terminal 410 is high as shown by the waveform K in FIGURE 5 and the left output terminal 406 is low as shown by the waveform I. The multivibrator 400 continues to operate in this condition until a high input is introduced to the left input terminal 426. The input to the terminal 426 is shown by the waveform H in FIGURE 5. It will be noted that the output at the terminal 406 will be high as at 464 upon the first clock fall 465 occurring after the input to the terminal 426 becomes high as shown at 466. At the same time that the output terminal 406 becomes high at 464, the output at the terminal 410 becomes low as shown at 467 in waveform K.

The multivibrator will continue to operate in this condition even though the input to the terminal 426 becomes low as shown at 470 in waveform H. When the input to the terminal 438 becomes high as shown at 472 in waveform J, the multivibrator will change its state of operation upon the next occurring clock fall 474. Upon the clock fall 474 the left output terminal 406 will become low as shown at 475 in waveform I and at the same time the right output terminal 410 will become high as shown at 476 in waveform K. The multivibrator 400 will continue to operate in this condition until a high input is again introduced to the left input terminal 426.

The bistable multivibrators shown in the counters 12 and 14 in FIGURE 2 operate in the manner disclosed above to make the left output terminal 406 high when the left input terminal 426 becomes high and to make the right output terminal 410 high when the right input terminal 438 becomes high.

As previously disclosed, the reference counter 14 produces an output pulse upon each count of 16 clock pulses. This is shown in FIGURE 6 where waveform A represents the clock pulses and waveform B represents the output of the counter 14. The output of the counter 14 is the reference signal or the carrier frequency for the phase or frequency modulated system disclosed herein.

When no command pulses are being introduced to the command counter 12, its output is identical to and, therefore, in phase with the output of the reference counter 14 (waveform B). Therefore, the inputs to the discriminator 16 from the counter 12 and the amplifier 24 are in phase and the D.-C. error voltage output of the discriminator is zero thus producing no movement of the drive 26 and the shaft 28.

When a command pulse is introduced to the left input of the multivibrator 100 (FIGURE 2) it causes the output of the command counter 12 to become retarded or advanced in phase a discrete amount (360/16 degrees for each command pulse) depending upon the polarity of the command pulse as will be hereinafter described. Initially, in each multivibrator in FIGURE 2 the left side is conducting and the right side is non-conducting. Therefore, the left output is low and the right output is high. A command pulse 500 is shown in waveform C in FIGURE 6. When this pulse is introduced to the left input of the multivibrator 100, the left output of the multivibrator becomes high upon the occurrence of the next clock pulse and the right output becomes low. Since the right input of the multivibrator 100 is connected to its left output which has become high, the occurrence of the next succeeding clock pulse causes the multivibrator to return to its initial condition. Therefore, the left output of the multivibrator 100 remains high and the right output low for one clock period upon the introduction of each command pulse. A clock period as referred to is the time period between successive clock pulses.

During this clock period when the right output is low, the inputs to the gates 104 and 106 of the first stage of the counter 12 are low. Therefore, the outputs of the gates 104 and 106 are low and the multivibrator 108 is prevented from changing its condition as it ordinarily would do upon the occurrence of each clock pulse in the binary counting process. In this way, one clock pulse is blocked from being counted upon the introduction of each command pulse. This occurs for both negative and positive command pulses.

When the command pulse 500 is negative, a low input is introduced to the gate 102 and its output is therefore low. Since the output of the gate 104 is also low, both inputs to the "or" gate 110 are low and, therefore, its output is low. Accordingly, the input to the gates 112 and 114 in the second stage of the counter is low, thus preventing the multivibrator 116 from changing its condition during the same clock period that the first stage blocks the count of one clock pulse. Since the output of the command counter 12 occurs upon each count of 16 pulses and one clock pulse 502 is blocked because of the introduction of the command pulse 500, the output of the counter is delayed until the occurrence of the 17th clock pulse 504 as shown in waveform D in FIGURE 6. In other words, the output of the command counter 12 is retarded one clock period relative to the output of the reference counter 14 or is retarded in phase 360/16 degrees relative to the output of the counter 14. Each command pulse of negative polarity will operate similarly to block the count of a clock pulse and retard the output phase 360/16 degrees. If there are $n$ command pulses, then the output will be retarded $360(n)/16$ degrees.

When the output of the counter 12 becomes retarded as disclosed above, the discriminator 16 detects the difference in phase between the output of the counter 12 and the output of the amplifier 24 which in one position of the rotor of the resolver 22 has the same phase as the output of the reference counter 14. This difference in phase produces at the output of the discriminator 16 a negative D.-C. error voltage for rotating the drive 26 and the shaft 28 in a first direction. The rotation occurs at a speed proportional to the magnitude of the error voltage at any instant. At the same time, the shaft 28 rotates the rotor of the resolver 22 a corresponding amount.

As the rotor is moved, the relative position of the rotor coil changes with respect to the stator windings 302 and 304, thus causing a corresponding phase shift in the output of the resolver and the amplifier 24. This phase shift is in a direction to reduce to zero the phase difference between the output of the amplifier 24 and the retarded output of the counter 12, so that the error voltage will be reduced to zero. When the rotor has rotated a distance such that the phase of the ouput of the amplifier 24 is the same as the phase of the output of the counter 12, then the error voltage is reduced to zero and rotation of the shaft 28 is stopped. The distance rotated by the shaft 28 to reduce the error voltage to zero is directly proportional to the number of command pulses thus accomplishing numerical control. For example, the drive 28 may operate to move the shaft 28 an angular distance of 2 degrees for each command pulse introduced to the system or a total angular distance of $n(2)$ degrees for $n$ command pulses. For 16 command pulses, the shaft would rotate 32 degrees and the rotor of the resolver 22 will have made one complete revolution. The gearing ratio between the shaft 28 and the rotor must be such as to provide this relationship since the outputs of the counters 12 and 14 will be back in phase once again when the counter 12 has been retarded 16(360/16) or 360 degrees.

When the command pulse 500 is positive, then the input to the gate 102 is high. Since the other input of the gate 102 is also high as a result of the left output of the multivibrator 100 being high for one clock period upon the introduction of a command pulse, the output of the gate is also high during that clock period. This high output causes the gate 110 to have a high output for introduction to the gates 112 and 114 in the second stage of the counter 12. Thus, even though the clock pulse 502 is blocked from being counted in the first stage of the counter as previously described, the pulse causes the second stage to change condition thereby giving rise to a double count or a count of 2 instead of a count of 1. This is true because the second stage of the counter 12 changes state upon each count of 2 clock pulses. Therefore, the counter in effect would reach the count of 16 during the same period it would normally count 15 clock pulses and would overflow one clock period earlier as shown in waveform E of FIGURE 6. In other words, the output of the command counter is advanced in phase 360/16 degrees relative to the output of the reference counter 12.

Similarly, each positive command pulse produces a 360/16 degrees advance in phase or a total advance of $n(360/16)$ degrees for $n$ command pulses. In the same manner as disclosed above with respect to negative command pulses, the discriminator 16 produces a positive error voltage to move the shaft 28 and the resolver rotor in an opposite direction. The shaft 28 will be rotated a discrete amount for each command pulse and a total distance directly proportional to the number of command pulses.

It is, therefore, seen that although the output of the reference counter remains the same, the phase of the output of the command counter becomes modulated a discrete amount for each command pulse received. The output is retarded or advanced a discrete amount depending upon whether each command pulse is negative or positive. The output of the command counter is, therefore, modulated numerically and represents the modulated signal for the servo system disclosed.

The present invention has many important advantages. It is simple and reliable in its operation and relatively inexpensive to produce because it uses a minimum number of components. The phase modulated signal at the output of the counter 12 and the reference signal 14 may be directly recorded on magnetic tape for storage or for use in operating one or more conventional phase modulated servo systems.

In co-pending application Serial No. 525,524, filed August 1, 1955, by E. C. Johnson et al., a machine tool system is disclosed in which numerical instructions recorded on a tape are converted into an equivalent number of command pulses spaced at substantially uniform time intervals. These command pulses are fed to a digital servo system for driving a machine tool part a distance proportional to the number of command pulses. In that servo system, the command pulses are first introduced to a reversible binary counter to which feedback pulses generated by unit movements of the machine tool part are also fed. The output of the reversible counter is an error voltage which is proportional to the difference between the number of command pulses and the number of feedback pulses. When the feedback pulses equal the command pulses, the error voltage is reduced to zero. This occurs after the machine tool part has moved the distance called for by the command pulses. The digital phase modulated servo system disclosed in this application could readily be substituted for the servo system used in the above said co-pending application. The command pulses derived from the instructions on a tape would instead be fed to the command counter 12 to drive the shaft 28 a distance proportional to the number of command pulses as previously described.

Although we have disclosed the control of a shaft rotation, it will be obvious to persons skilled in the art that the shaft rotation may be readily converted into linear motion of a machine tool part such as by utilizing a worm gear arrangement. Furthermore, the movement of a machine tool part may be controlled in two or more axes by utilizing two or more servo systems similar to the one shown in FIGURE 1 and feeding separate instructions to each system.

It will also be obvious to persons skilled in the art that the system disclosed may be used to achieve position control of a machine tool part as well as the continuous type control by the introduction of a series of command pulses as described herein. Position control may be accomplished by inserting a particular count into the command counter 12. For example, if it were desired to move a machine tool part from a first position to second position a distance of 4 units, a count of 4 could be inserted into the counter 12. This could be done by introducing a pulse to the third stage of the counter from an external source thus causing the third stage to change state upon occurrence of the next clock pulse. Depending upon the direction of movement desired, the output of the counter 12 would then be retarded or advanced in phase an amount proportional to the inserted count. The servo system would then operate to drive the machine tool part a distance of 4 units to the second position where it would come to a stop. At this second position a certain operation, such as drilling, could be performed by the machine tool. Subsequently another count could be inserted into the counter 12 for moving the part to a third position where another operation could be performed by the machine tool.

Although this invention has been disclosed and illustrated with reference to particular applications, the principles involved are susceptible of numerous other applications which will be apparent persons skilled in the art. The invention is, therefore, to be limited only as indicated by the scope of the appended claims.

Having thus described our invention, we claim:

1. In a phase modulated servo system for moving an object a discrete distance for each command pulse introduced to the system and in a direction dependent upon the polarity of each command pulse, a source of constant frequency input pulses, a first counter for counting the input pulses and for producing an output pulse upon each count of a particular number of input pulses, the output pulses of the first counter having a reference phase, a second counter for counting the input pulses and for producing an output pulse upon each count of the particular number of input pulses, the output of the second counter being in phase with the output of the first counter, means provided in the second counter for increasing its count a particular amount upon the introduction of each command pulse of a first polarity and for decreasing its count the same amount upon the introduction of each command pulse of a second polarity, thereby advancing the phase of the output pulses of the second counter a discrete amount for each command pulse of first polarity and retarding the phase a discrete amount for each command pulse of second polarity, and means for comparing the outputs of the first and second counters and for producing an error signal having a magnitude proportional to their phase difference and a polarity dependent upon the polarity of the command pulses.

2. In a servo system as recited in claim 1 wherein the first and second counters include a plurality of frequency dividing stages.

3. In a servo system as recited in claim 1 wherein the count in the second counter is increased by one upon the introduction of each command pulse of the first plurality and is decreased by one upon the introduction of each command pulse of the second polarity.

4. In a phase modulated servo system for moving an object a distance proportional to a whole number, a source of constant frequency input pulses, a first counter for counting the input pulses and for producing an output pulse upon each count of a particular number of input pulses, the output pulses of the first counter having a reference phase, a second counter for counting the input pulses and for producing an output pulse upon each count of the particular number of input pulses, the output pulses of the second counter being in phase with the output pulses of the first counter, means for varying the phase of the output pulses of the second counter with respect to the phase of output pulses of first counter an amount proportional to the whole number, and means for comparing the outputs of the first and second counters and for producing an error signal having a magnitude proportional to their phase difference.

5. In a phase modulated servo system for moving an object a distance proportional to the number of electrical pulses introduced to the system, first means for producing a first electrical signal having a reference phase, second means for producing a second electrical signal having the same phase as the first electrical signal, said second means being operative upon the introduction of electrical pulses to change the phase of the second electrical signal an amount proportional to the number of electrical pulses introduced to the second means, and means for comparing the first and second electrical signals and for producing an error signal proportional to their phase difference.

6. In a phase modulated servo system for moving an object a distance proportional to the number of electrical pulses introduced to the system and in a direction dependent upon the polarity of the pulses, first means for producing a first electrical signal having a reference phase, second means for producing a second electrical signal having the same phase as the first electrical signal, said second means being operative upon receiving electrical pulses to change the phase of the second electrical signal an amount proportional to the number of electrical pulses received and in a direction dependent upon the polarity of the pulses, and means for comparing the first and second signals and for producing an error signal proportional to their phase difference and having a polarity dependent upon the polarity of the pulses received by the second means.

7. In a phase modulated servo system for moving an object a discrete distance for each command pulse introduced to the system and in a direction dependent upon the polarity of each command pulse, a source of constant frequency input pulses, a first counter for counting the input pulses and for producing an output pulse at regular intervals upon each count of a particular number of input pulses, the output pulses of the first counter providing a reference signal of constant phase, a second counter for counting the input pulses and for producing an output pulse at regular intervals upon each count of the particular number of input pulses, the output of the second counter being in phase with the output of the first counter, means connected to the second counter for increasing its count by one upon the introduction of each command pulse of a first polarity to said means so as to advance the production of the output pulse of the counter by an amount proportional to the number of command pulses of the first polarity and for decreasing its count by one upon the introduction of each command pulse of a second polarity to said means so as to retard the production of the output pulse of the counter by an amount proportional to the number of command pulses of the second polarity, and means for comparing the outputs of the first and second counters and for porducing an error signal having a magnitude proportional to their phase difference and a polarity dependent upon the polarity of the command pulses.

8. In a phase modulated servo system for moving an object a discrete distance for each command pulse introduced to the system and in a direction dependent upon the polarity of each command pulse, a source of constant frequency input pulses, a first counter for counting the input pulses and for producing an output pulse upon each count of a particular number of input pulses, the output pulses of the first counter providing a reference signal of constant phase, a second counter for counting the input pulses and for producing an output pulse upon each count of the particular number of input pulses, the output of the second counter being in phase with the output of the first counter, means connected to the second counter to prevent the counter from counting one input pulse upon the introduction of each command pulse of a first polarity to said means so as to retard the production of the output pulse of the counter an amount proportional to the number of command pulses of the first polarity and to produce in the counter a count of two for one input pulse upon the introduction of each command pulse of a second polarity to said means so as to advance the production of the output pulse of the counter an amount proportional to the number of command pulses of the second polarity, and means for comparing the outputs of the first and second counters and for producing an error signal having a magnitude proportional to their phase difference and a polarity dependent upon the polarity of the command pulse.

9. In a phase modulated servo system for moving an object a discrete distance for each command pulse introduced to the system and in a direction dependent on the polarity of each command pulse, a source of constant frequency input pulses, a first binary counter having a plurality of bistable stages for counting the input pulses and for producing an output pulse upon each count of a particular number of input pulses, the output pulses of the first binary counter providing a reference signal of constant phase, a second binary counter having the same number of bistable stages as the first binary counter for counting the input pulses and for producing an output pulse upon each count of the particular number of input pulses, the output of the second counter being in phase with the output of the first counter, means being operative upon the introduction of each command pulse of a first polarity to prevent the first bistable stage from changing state for one input pulse so as to retard the production of the output pulses of the counter an amount proportional to the number of command pulses of the first polarity, said means being operative upon the introduction of each command pulse of a second polarity to prevent the first bistable stage from changing state for one input pulse and to produce instead a change of state in the second bistable stage so as to advance the production of the output pulse of the counter an amount proportional to the number of command pulses of the second polarity, and means for comparing the outputs of the first and second binary counters and for producing an error signal having a magnitude proportional to their phase difference and a polarity dependent upon the polarity of the command pulses.

10. In a phase modulated servo system for moving an object a discrete distance for each command pulse introduced to the system and in a direction dependent upon the polarity of each command pulse, a source of constant frequency input pulses, a first binary counter including a plurality of multivibrator stages each having an output connected to the input of the succeeding multivibrator, the last multivibrator producing an output pulse upon each count by the counter of a particular number of input pulses, the output pulses of the first binary counter providing a reference signal of constant phase, a second binary counter having the same number of multivibrator stages as the first counter for counting the input pulses and for producing at the output of the last multivibrator an output pulse upon each count of the particular number of input pulses, the output of the second binary counter being in phase with the output of the first binary counter, a control multivibrator having one output connected to the input of the first stage in the second counter and the other output connected to the second stage in the second counter, the control multivibrator being operative upon receiving each command pulse of a first polarity at one of its inputs to prevent the first stage from changing state during the application of an input pulse so as to retard the production of the output pulse by the last stage in an amount proportional to the number of command pulses of the first polarity, the control multivibrator also being operative upon receiving each command pulse of a second polarity at one of its inputs to prevent the first stage from changing state and to instead produce a change of state in the second stage so as to advance the production of the output pulse in the last stage an amount proportional to the number of command pulses of the second polarity, and means for comparing the outputs of the last stages in the first and second binary counters and for producing an error signal having a magnitude proportional to their phase difference and a polarity dependent upon the polarity of the command pulses.

References Cited in the file of this patent

UNITED STATES PATENTS

| | | |
|---|---|---|
| 2,549,505 | Mohr | Apr. 17, 1951 |
| 2,715,678 | Barney | Aug. 16, 1955 |
| 2,735,005 | Steele | Feb. 14, 1956 |
| 2,760,132 | Pawley | Aug. 21, 1956 |
| 2,766,940 | Weston | Oct. 16, 1956 |
| 2,768,290 | Harris et al. | Oct. 23, 1956 |
| 2,813,241 | Smith et al. | Nov. 12, 1957 |
| 2,819,438 | Angelo | Jan. 7, 1958 |
| 2,833,941 | Rosenberg | May 6, 1958 |

OTHER REFERENCES

Findlay: Electronic Controls for Machine Tools, Electronics, February 1956, pages 122–129.

Electronics, October 1956, pages 220–23, "Phase Generator for Tropospheric Research," by Hubbard et al.

Notice of Adverse Decision in Interference

In Interference No. 93,840 involving Patent No. 3,011,110, Yu-Chi Ho and E. C. Johnson, Phase or frequency modulated digital servo system, final judgment adverse to the patentees was rendered Aug. 20, 1964, as to claims 1, 2, 3, 4, 5, 6, 7, and 8.
[*Official Gazette October 27, 1964.*]